(12) United States Patent
Murayama et al.

(10) Patent No.: US 11,972,314 B2
(45) Date of Patent: Apr. 30, 2024

(54) INFORMATION PROCESSING APPARATUS WITH AUTOMATIC DETECTION AND INTERRUPTION OF DEFECTIVE IMAGE FORMING OPERATIONS

(71) Applicant: CANON KABUSHIKI KAISHA, Tokyo (JP)

(72) Inventors: Tatsuomi Murayama, Chiba (JP); Isami Itoh, Kanagawa (JP); Sumito Tanaka, Tokyo (JP); Sho Ikemoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/349,881

(22) Filed: Jul. 10, 2023

(65) Prior Publication Data

US 2023/0351136 A1    Nov. 2, 2023

Related U.S. Application Data

(63) Continuation of application No. 17/176,985, filed on Feb. 16, 2021, now Pat. No. 11,727,235.

(30) Foreign Application Priority Data

Feb. 21, 2020    (JP) ................................. 2020-028538

(51) Int. Cl.
*G06K 15/00*    (2006.01)
*G06K 15/02*    (2006.01)

(52) U.S. Cl.
CPC ......... *G06K 15/408* (2013.01); *G06K 15/002* (2013.01); *G06K 15/027* (2013.01)

(58) Field of Classification Search
CPC ................ G06K 15/027; G06F 3/1256; H04N 1/00029; H04N 1/00034; H04N 1/00045; H04N 2201/0005
USPC ................................................ 358/1.14, 1.15
See application file for complete search history.

(56) References Cited

U.S. PATENT DOCUMENTS

| | | | |
|---|---|---|---|
| 2010/0033743 A1 | 2/2010 | Hirai | 358/1.9 |
| 2011/0019245 A1 | 1/2011 | Adachi | H04N 1/40 |
| 2012/0163852 A1 | 6/2012 | Kimura | G03G 15/00 |
| 2014/0036290 A1 | 2/2014 | Miyagawa et al. | H04N 1/40 |

(Continued)

FOREIGN PATENT DOCUMENTS

| | | |
|---|---|---|
| JP | 2010-042521 | 2/2010 |
| JP | 2013-252632 | 12/2013 |

*Primary Examiner* — Kent Yip
(74) *Attorney, Agent, or Firm* — Venable LLP

(57) ABSTRACT

An information processing apparatus, which communicates with an image forming apparatus and a reader, including: a display; and a controller configured to: obtain read image data output from the reader; determine an error of the read image data based on the read image data and reference data; cancel image forming operation of the image forming apparatus in a case where the error is determined in succession a predetermined number of times; cancel reading operation of the reader in the case where the error is determined in succession the predetermined number of times; notify, on the display, the cancellation of the image forming operation and the reading operation in the case where the error is determined in succession the predetermined number of times; and receive a user's instruction information about the predetermined number of times.

19 Claims, 12 Drawing Sheets

(56) References Cited

U.S. PATENT DOCUMENTS

| 2015/0131116 | A1* | 5/2015 | Sochi | H04N 1/00045 |
| | | | | 358/1.14 |
| 2019/0102270 | A1 | 4/2019 | Dennison | G06F 11/22 |
| 2020/0133182 | A1 | 4/2020 | Haik et al. | G03G 15/00 |

* cited by examiner

FIG. 4A
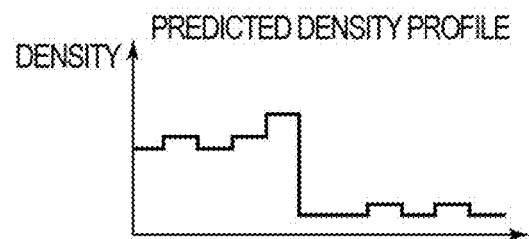
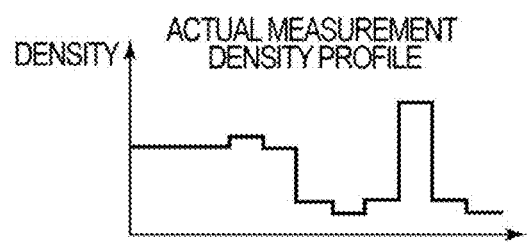
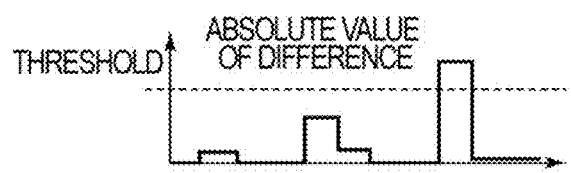
FIG. 4B
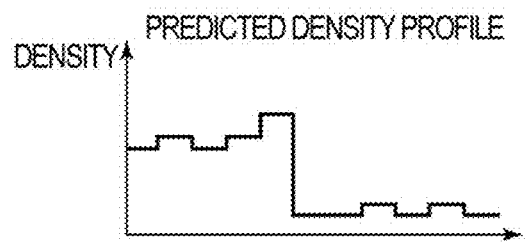
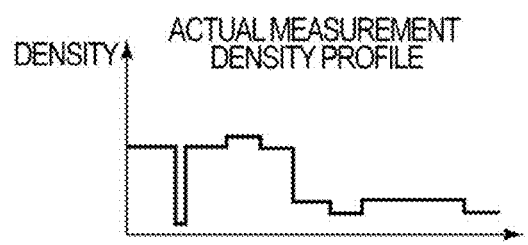
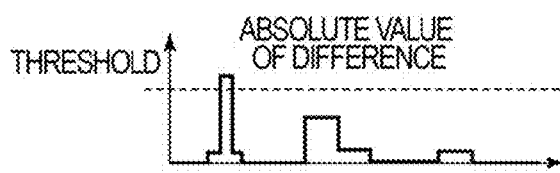

AUTOMATIC CANCELLATION OF INSPECTION

○ DO NOT DO

● AUTOMATICALLY CANCEL WHEN CONTINUOUS NG OCCURS

NUMBER OF CONTINUOUS NG: [ 5 ]

[ OK ]  [ CANCEL ]

| ERROR | INSPECTION START |

| NUMBER OF INSPECTION | NUMBER OF NG | NG RATE |
| 500 (500 SHEETS) | 5 | 1 |

AUTOMATIC CANCELLATION

INSPECTION WILL BE CANCELLED
BECAUSE NG HAS OCCURRED CONTINUOUSLY

[ OK ]

INFORMATION PROCESSING APPARATUS WITH AUTOMATIC DETECTION AND INTERRUPTION OF DEFECTIVE IMAGE FORMING OPERATIONS

This application is a continuation of application Ser. No. 17/176,985 filed Feb. 16, 2021, currently pending; and claims priority under 35 U.S.C. § 119 to Japan Application JP 2020-028538 filed in Japan Feb. 21, 2020; and the contents of all of which are incorporated herein by reference as if set forth in full.

BACKGROUND OF THE INVENTION

Field of the Invention

The present invention relates to an inspection technology for inspecting an output image formed by an image forming apparatus on a recording medium.

Description of the Related Art

Inspection work on a printed material has been performed by a worker's visual inspection based on experience of the worker. A visual check of an enormous volume of printed materials, however, is a heavy burden on the worker and also invites a high probability of mistakes in checking. Further, a visual check of printed materials output at high speed from an image forming apparatus cannot be said to be high in work efficiency. Automatic inspection in synchronization with printing of a printed material output from a high-speed image forming apparatus compatible with various media has therefore been sought after.

In recent years, there has been developed a system in which a printed material output from an image forming apparatus is read by a sensor, image data obtained by the reading is subjected to image processing, and the processed image data is compared to print data that is original data, to thereby detect defects caused at a time of printing, such as stains, blank spots, and skew feeding in printing. The system further controls a finisher provided with a plurality of discharge portions, based on a determination result of a printed material, to change a discharge position for a printed product that is a normally printed material and for a printed product that is a printed material having a detected defect. With this technique, a printed product that is a printed material with a printing defect and a printed product that is a printed material without a printing defect can be sorted (Japanese Patent Application Laid-Open No. 2010-42521).

In the inspection system of the related art, when specks adhere to the reading sensor or a similar trouble occurs, shadows of the specks or the like appear on image data generated by reading a printed material. Data inconsistency due to an effect of the specks or the like is consequently inevitable in a comparison between the image data read in an inspection process and print data that is original data, and an inspection result indicating an error is returned. Then, the inspection process cannot be resumed unless the specks that are the cause of the error are removed, or, in the case of a scratch or the like in a reading portion, the scratch is removed by a repair, and production ceases for that duration.

Dust accidentally mixed in at the time of reading a printed material, instead of the adhering dust described above, produce an inspection result indicating an error as well when data inconsistency is caused by the mixed-in dust. The accidentally mixed-in dust may not affect a subsequent inspection process. However, the inspection process is stopped because whether the dust are fixed dust or temporarily present dust cannot be determined, and production ceases for that duration.

Precision at which inspection is to be performed and items to be inspected vary depending on a user's request and contents of data to be inspected. In inspection of a printed material in which various data contents are mixed, some inspection items may cause a significant drop in processing speed. There is a technology that can improve a degree of certainty and productivity of the inspection process by solving the above-mentioned problem (Japanese Patent Application Laid-Open No. 2013-252632).

In an information processing apparatus of the related art, image forming operation continues until all images corresponding to a print job finish being formed, despite an inspection result indicating an error. That is, the information processing apparatus of the related art cannot stop the image forming operation by an image forming apparatus even when successive inspection results indicate errors. The information processing apparatus of the related art therefore has a possibility that printed products whose inspection results indicate errors are kept output when, for example, there is an abnormality in the image forming apparatus or a reader. That may disadvantage a user by wasting a recording medium, which is assets of the user.

SUMMARY I/F THE INVENTION

It is therefore an object of the present invention to inhibit continuation of output of printed products that are determined to be errors as a result of inspection.

There is provided an information processing apparatus which is communicable in communication to and from an image forming apparatus configured to form an image on a sheet, and in communication to and from a reader configured to read the image on the sheet, the reader being connected to the image forming apparatus, the information processing apparatus comprising: a display configured to display an inspection result; and a controller configured to: obtain read image data output from the reader; determine an error of the read image data based on the read image data and reference data registered in advance; cancel image forming operation of forming an image by the image forming apparatus in a case in which the error is determined in succession a predetermined number of times; cancel reading operation of reading an image by the reader in the case in which the error is determined in succession the predetermined number of times; notify, on the display, the cancellation of the image forming operation and the reading operation in the case in which the error is determined in succession the predetermined number of times; and receive a user's instruction information about the predetermined number of times.

Further features of the present invention will become apparent from the following description of exemplary embodiments with reference to the attached drawings.

BRIEF DESCRIPTION I/F THE DRAWINGS

FIG. 4A and FIG. 4B are each a group of graphs for showing an example of processing of profile calculation that is performed with respect to a vertical line.

FIG. 12 is a schematic diagram of a setting screen.

FIG. 13 is a schematic diagram of a cancellation screen.

DESCRIPTION I/F THE EMBODIMENTS

First Embodiment

Embodiments are described below with reference to the accompanying drawings. In the following description, an external controller 102 is referred to as "image processing controller," "digital front end," "print server," or "DFE" in some places. An image forming apparatus 101 is referred to as "multi-function printer," "multi-function peripheral," or "MFP" in some places.

Printing System

Figure 1:
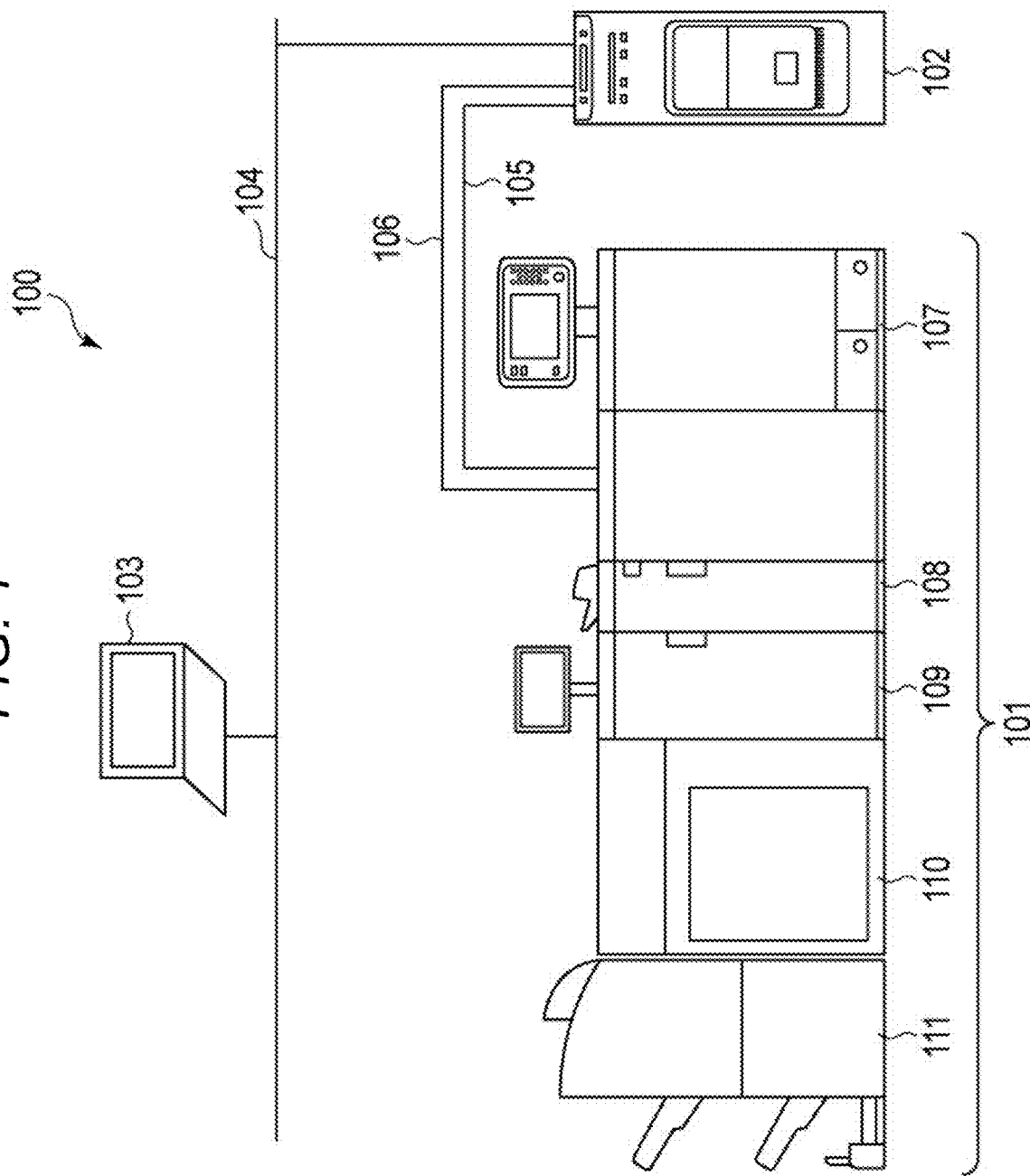
FIG. 1 is an overall view of a hardware configuration of a printing system.

FIG. 1 is an overall view of a hardware configuration of a printing system 100. The printing system 100 includes the image forming apparatus 101 and the external controller 102. The image forming apparatus 101 and the external controller 102 are connected in a manner that allows communication via an internal LAN 105 and a video cable 106. The external controller 102 is connected to a client personal computer (hereinafter referred to as "PC") 103 in a manner that allows communication via an external LAN 104. The PC 103 issues a print instruction to the external controller 102.

A printer driver having a function of converting print data that is original data into a print description language processable by the external controller 102 is installed in the PC 103. A user can issue a print instruction to the external controller 102 via the printer driver from various applications. The printer driver transmits print data to the external controller 102 based on the print instruction from the user. When receiving the print instruction from the PC 103, the external controller 102 performs data analysis and rasterization processing, and executes transmission of the print data and issuing of a print instruction to the image forming apparatus 101.

The image forming apparatus 101 is described next. A plurality of devices having different functions are connected to the image forming apparatus 101 so that complicate printing processing, for example, binding, is executable. The image forming apparatus 101 includes a printer 107, an inserter 108, an inspection device 109, a high capacity stacker 110, and a finisher 111.

Figure 5:
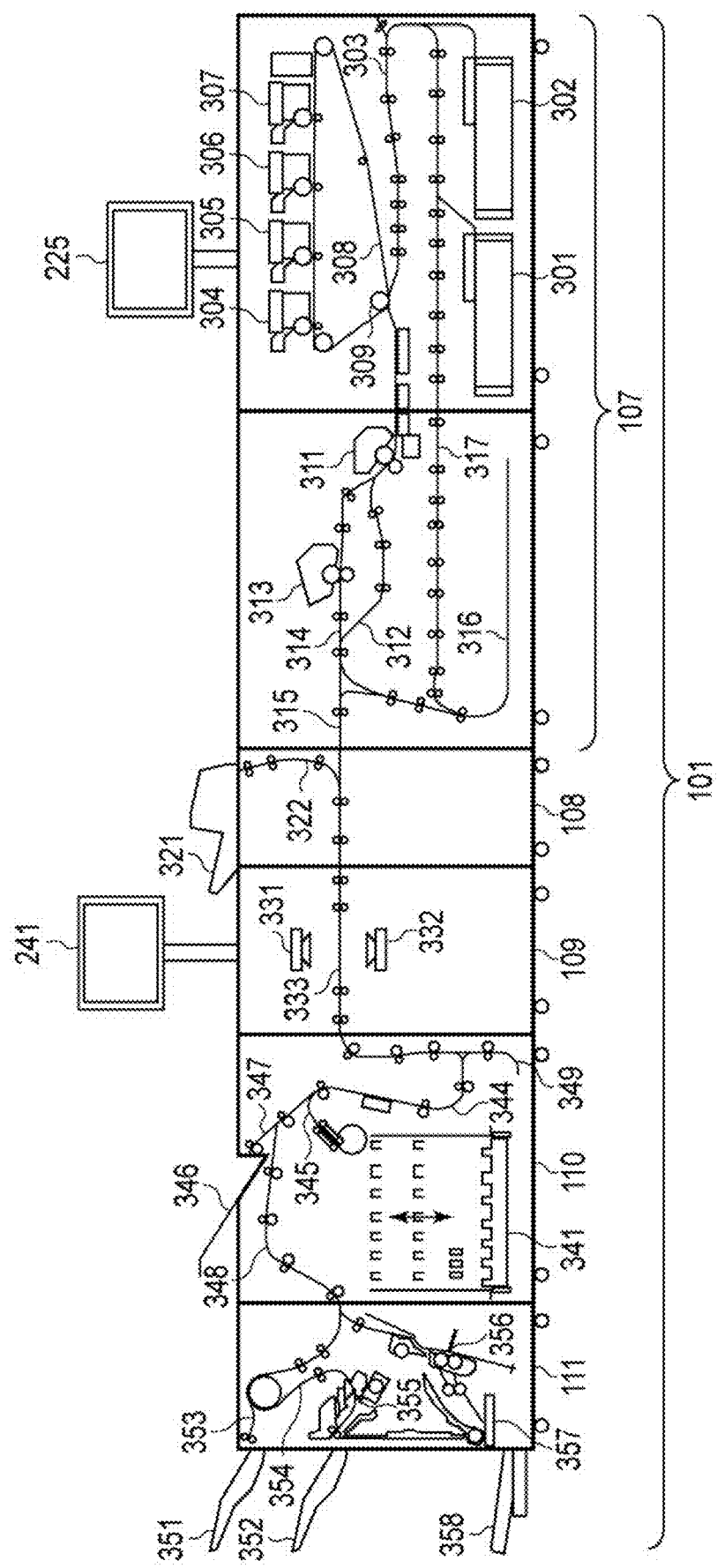
FIG. 5 is a cross-sectional view of an image forming apparatus.

The printer 107 as an image forming unit is configured to form an image, with the use of a toner, on paper or another recording medium (hereinafter referred to as "sheet") conveyed from a feed portion, which is located in a lower part of the printer 107. A configuration and operation principle of the printer 107 are as follows. A surface of a photosensitive drum is uniformly charged to a predetermined electric potential by a charging unit. A beam of light (hereinafter referred to as "laser light") modulated based on print data (image data that is original data) is reflected by a rotary polygon mirror, and the reflected light irradiates the surface of the photosensitive drum as scanning light. The uniformly charged surface of the photosensitive drum is exposed to the laser light, with the result that an electrostatic latent image is formed on the surface of the photosensitive drum. The electrostatic latent image formed on the surface of the photosensitive drum is developed with a toner to form a toner image. The toner image formed on the surface of the photosensitive drum is transferred onto the sheet by a transfer drum. This series of steps of an image forming process is sequentially executed with the use of a yellow (Y) toner, a magenta (M) toner, a cyan (C) toner, and a black (K) toner, to thereby form a full-color image on the sheet. The sheet with the full-color image formed thereon is conveyed to a first fixing unit 311 (FIG. 5). The first fixing unit 311 is configured to apply heat and pressure to the sheet to which the toner image has been transferred, to thereby fix the toner image to the sheet.

The inserter 108 is configured to insert an insertion sheet in a suitable place in relation to a group of sheets printed by and conveyed from the printer 107. The inspection device 109 reads an image of a sheet conveyed thereto, and determines whether the printed image is normal by a comparison of image data obtained by the reading to correct image data (reference data) stored in advance in a memory. The correct image data is registered by any method. The correct image data may be generated by, for example, performing RIP processing on print data forwarded from the PC 103, or reading, with the inspection device 109, a printed product on which printing has been performed in advance. A large number of sheets can be placed on the high capacity stacker 110. The finisher 111 is configured to perform post-processing on a sheet conveyed thereto. The post-processing is, for example, stapling, punching, saddle stitch binding, and the like. A sheet with an image formed thereon is discharged to a discharge tray of the finisher 111.

The printing system 100 illustrated in FIG. 1 has a configuration in which the external controller 102 is connected to the image forming apparatus 101. The printing system 100, however, is not limited to the configuration in which the external controller 102 is connected to the image forming apparatus 101. For example, the printing system 100 may be configured so that the image forming apparatus 101 is connected to the external LAN 104 to receive print data processable by the image forming apparatus 101 from the PC 103 via the external LAN 104. In this case, data analysis and rasterization processing are performed in the image forming apparatus 101, and the image forming apparatus 101 executes printing processing.

Figure 2:
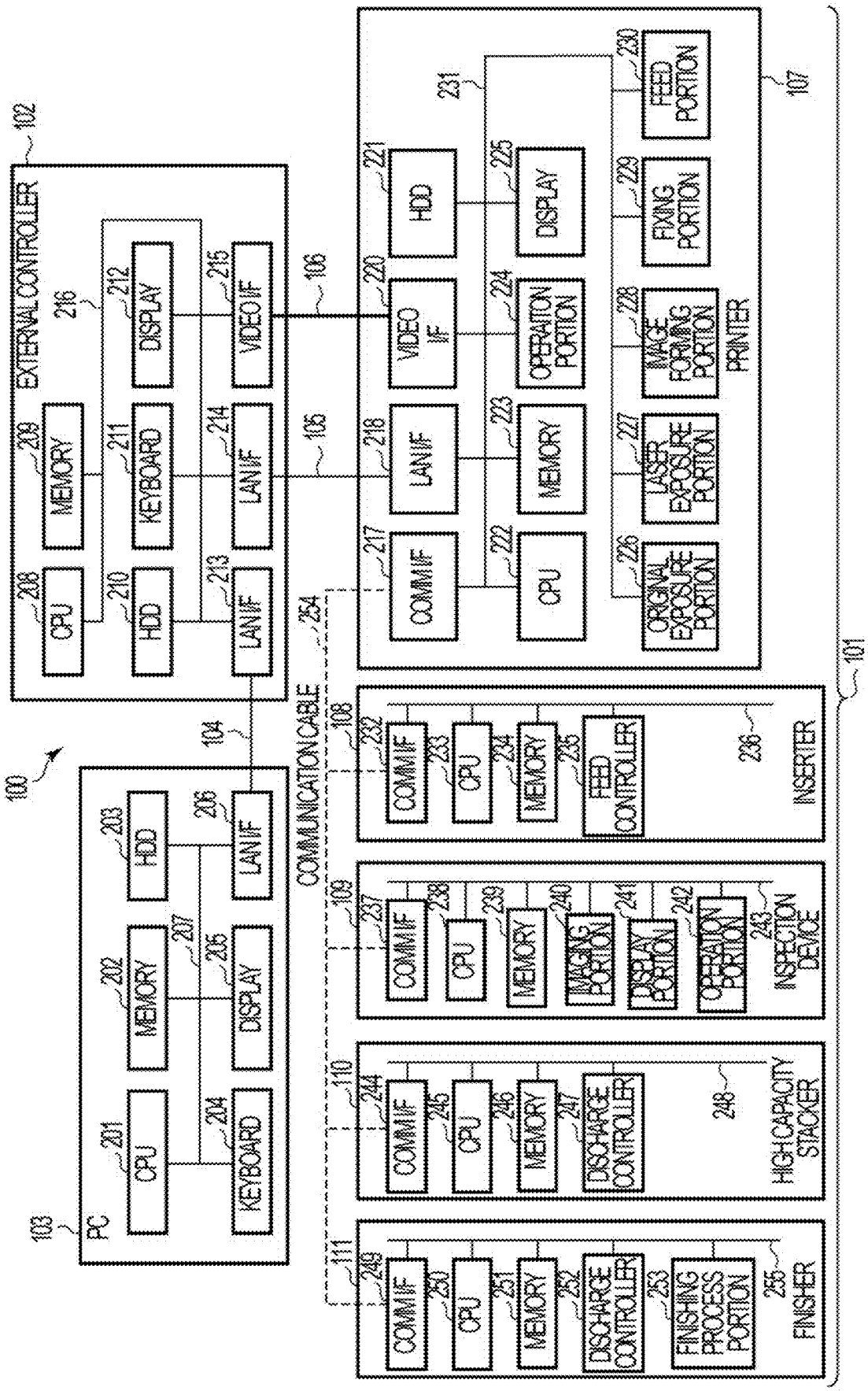
FIG. 2 is a block diagram of a system configuration of the printing system.

FIG. 2 is a block diagram of a system configuration of the printing system 100. A configuration of the printer 107 of the image forming apparatus 101 is described first. The printer 107 includes a communication I/F (COMM I/F) 217, a LAN I/F 218, a video I/F 220, an HDD 221, a CPU 222, a memory 223, an operation portion 224, and a display portion (display) 225. The printer 107 further includes an original exposure portion 226, a laser exposure portion 227, an image forming portion 228, a fixing portion 229, and a feed portion 230. The components are connected to one another via a system bus 231.

The communication I/F 217 is connected to, via a communication cable 254, the inserter 108, the inspection device 109, the high capacity stacker 110, and the finisher 111. Communication for controlling the devices is held via the communication cable 254. The LAN I/F 218 is connected to the external controller 102 via the internal LAN 105. Print data is communicated between the external controller 102 and the printer 107 via the internal LAN 105. The video I/F 220 is connected to the external controller 102 via the video cable 106. Image data is communicated between the external controller 102 and the printer 107 via the video cable 106. The HDD 221 is a storage device in which programs and data are stored. The CPU 222 is configured to perform image processing control and printing control in a comprehensive manner, based on a program stored in the HDD 221. The memory 223 stores programs and image data required when the CPU 222 executes various types of processing, and operates as a work area. The operation portion 224 is configured to receive input of various settings and an instruction on operation from the user. The display portion 225 is configured to display settings information of the printer 107 and a processing status of a print job.

The original exposure portion 226 executes processing of reading an original when a copy function or a scan function is used. The user places an original on platen glass (an original table), and an image of the original irradiated with light from an exposure lamp is taken with a CCD camera, to thereby read image data of the original.

The laser exposure portion 227 is configured to perform primary charging in which the surface of the photosensitive drum is uniformly charged, and laser exposure. The laser exposure portion 227 first charges the surface of the photosensitive drum to a uniform negative electric potential (primary charging). The laser exposure portion 227 next uses a laser driver to emit laser light in a pattern based on image data, and irradiates the photosensitive drum with the laser light at a reflection angle adjusted by the polygon mirror. Negative electric charges in a part irradiated with the laser light are thus neutralized and an electrostatic latent image is consequently formed on the surface of the photosensitive drum.

The image forming portion 228 includes a developing unit, a transfer unit, and a toner replenishment portion. The developing unit is configured to cause a negatively charged toner from a developing cylinder to adhere to the electrostatic latent image on the surface of the photosensitive drum, to thereby turn the electrostatic latent image into a toner image. The transfer unit includes a primary transfer roller and a secondary transfer outer roller. The transfer unit is configured to apply a positive electric potential to the primary transfer roller to transfer the toner image on the surface of the photosensitive drum to a transfer belt (primary transfer). The transfer unit is also configured to apply a positive electric potential to the secondary transfer outer roller to transfer the toner image on the transfer belt to a sheet (secondary transfer).

The fixing portion 229 includes a heater, a fixing belt, and a pressure belt. The fixing portion 229 is configured to apply pressure and heat to the sheet at a nip between the fixing belt and the pressure belt to melt the toner image and thus fix the toner image to the sheet. The feed portion 230 is configured to control sheet feeding operation and sheet conveying operation with rollers and various sensors.

A configuration of the inserter 108 of the image forming apparatus 101 is described next. The inserter 108 includes a communication I/F 232, a CPU 233, a memory 234, and a feed controller 235. The components are connected to one another via a system bus 236. The communication I/F 232 is connected to the printer 107 via the communication cable 254. The inserter 108 holds communication required for control to and from the printer 107 via the communication cable 254. The CPU 233 is configured to perform various types of control required for feeding in accordance with a control program stored in the memory 234. The memory 234 is a storage device in which the control program is stored. The feed controller 235 is configured to control a feed portion, rollers, and sensors of the inserter 108 following an instruction from the CPU 233, to control the feeding of a sheet conveyed from the printer 107.

A configuration of the inspection device 109 of the image forming apparatus 101 is described next. The inspection device 109 includes a communication I/F 237, a CPU 238, a memory 239, an imaging portion 240, a display portion 241, and an operation portion 242. The components are connected to one another via a system bus 243. The communication I/F 237 is connected to the printer 107 via the communication cable 254. The inspection device 109 holds communication required for control to and from the printer 107 via the communication cable 254. The CPU 238 is configured to perform various types of control required for inspection operation in accordance with a control program stored in the memory 239. The memory 239 is a storage device in which the control program is stored. The imaging portion 240 includes image reading sensors 331 and 332 (FIG. 5) as a reading unit configured to read an image that is formed on a sheet. The imaging portion 240 is configured to take an image of a conveyed sheet following an instruction of the CPU 238. The CPU 238 compares read image data obtained through the image taking by the imaging portion 240 to correct image data stored in the memory 239 to determine whether the image formed on the sheet is normal. The display portion 241 is configured to display an inspection result and a setting screen 141 (FIG. 12). The operation portion 242 is operated by the user to receive a change to settings of the inspection device 109 and an instruction to register correct image data.

Figure 3A:
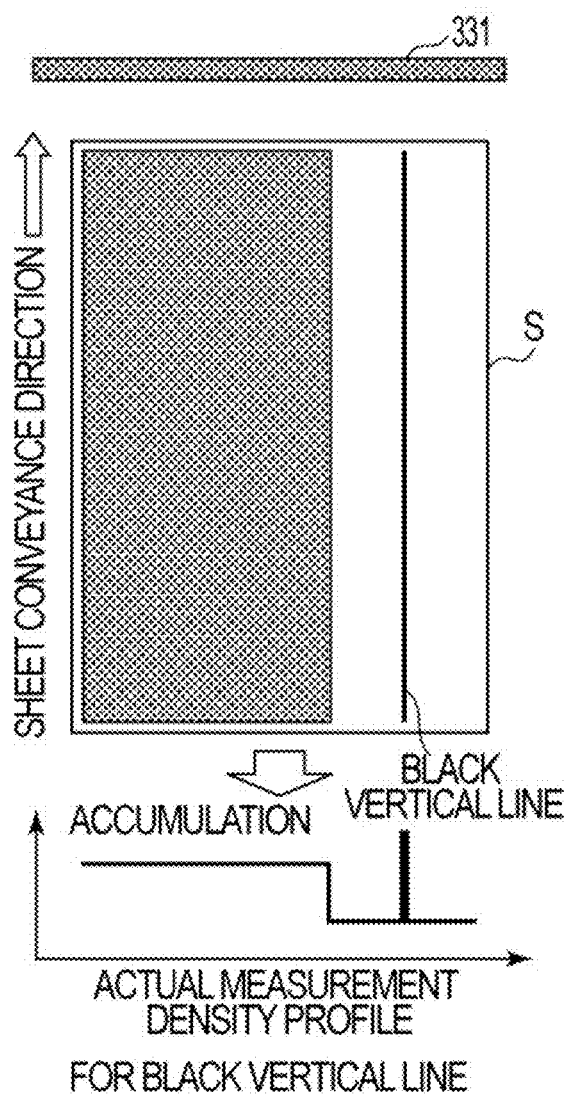
FIG. 3A and FIG. 3B are each a diagram for illustrating an example of processing of an inspection image that is performed with respect to a vertical line.
Figure 3B:
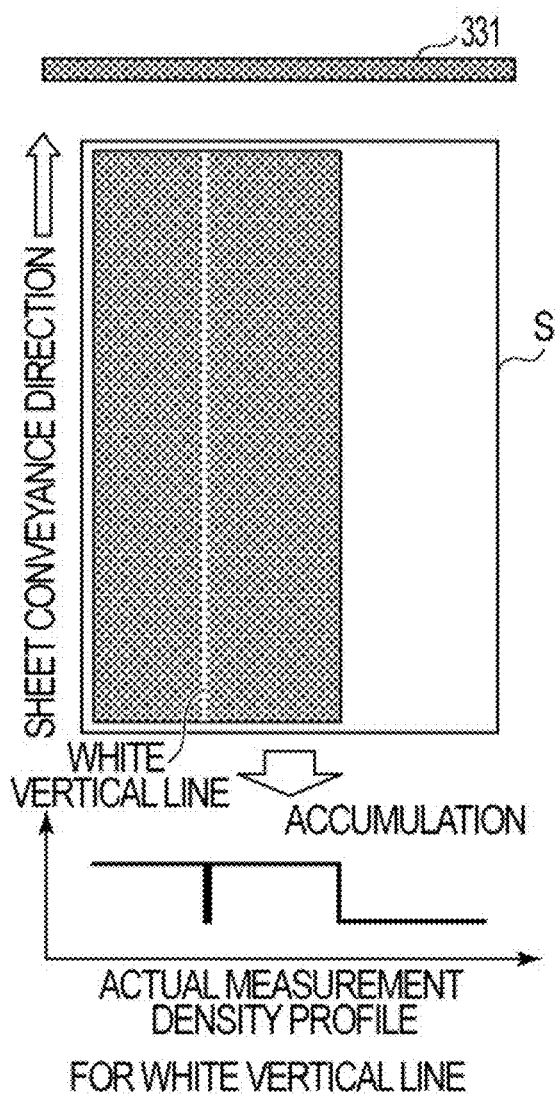

The CPU 238 as a determination unit determines whether there is an image defect in the image formed on the sheet, based on reading results (detection results) of the image reading sensors 331 and 332 (FIG. 5). An inspection process in which an image is inspected for an image defect is described below with reference to FIG. 3A, FIG. 3B, FIG. 4A, and FIG. 4B. FIG. 3A and FIG. 3B are each a diagram for illustrating an example of processing that is executed when a vertical line appears in an image to be inspected (inspection image). FIG. 3A is a diagram for illustrating a sheet S on which a black vertical line is formed and an actual measurement density profile of the sheet S. FIG. 3B is a diagram for illustrating a sheet S on which a white vertical line is formed and an actual measurement density profile of the sheet S. There are various methods of inspection of an output image. The method of inspection of the first embodiment is not limited to the following method. Various inspection methods may be employed in the first embodiment. Here, examples of vertical line detection are described. Detection of a vertical line in an output image is executed by the CPU 238 through a comparison of an actual measurement density profile. The "actual measurement density profile" here means what is obtained by measuring an image density at each position in a width direction of the sheet S being conveyed, and integrating image densities in a sheet conveyance direction at the position.

The CPU 238 first generates the actual measurement density profile by integration of an image on the sheet S that has been read by the image reading sensor 331, along the sheet conveyance direction as illustrated in FIG. 3A and FIG. 3B. The CPU 238 compares the generated actual measurement density profile to a profile of image data that is original data, to thereby inspect the image on the sheet S. Two streak types are assumed here, with one being a black vertical line, which is a longitudinal line running in a white part as illustrated in FIG. 3A, and the other being a white vertical line, which is a blank streak caused by a missing part of the image as illustrated in FIG. 3B.

FIG. 4A and FIG. 4B are each a group of graphs for showing an example of processing of profile calculation that is performed with respect to a vertical line. FIG. 4A is a group of graphs for showing a predicted density profile, an actual measurement density profile, and an absolute value of a difference for the black vertical line. FIG. 4B is a group of graphs for showing a predicted density profile, an actual measurement density profile, and an absolute value of a difference for the white vertical line. The CPU 222 of the printer 107 transmits image data that is original data to the CPU 238 of the inspection device 109. The CPU 238 of the inspection device 109 generates, in advance, a predicted density profile by integration in a vertical direction based on the received image data that is original data. The CPU 238 calculates a difference between the generated predicted density profile and the actual measurement density profile. The CPU 238 determines whether the sheet S on which the image has been formed by the printer 107 is a defective sheet based on whether the absolute value of the difference between the predicted density profile and the actual measurement density profile exceeds a predetermined threshold value. Sheet information and the threshold value (inspection threshold value) can be set in a discretionary manner.

A configuration of the high capacity stacker 110 of the image forming apparatus 101 is described next. The high capacity stacker 110 includes a communication OF 244, a CPU 245, a memory 246, and a discharge controller 247. The components are connected to one another via a system bus 248. The communication I/F 244 is connected to the printer 107 via the communication cable 254. The high capacity stacker 110 holds communication required for control to and from the printer 107 via the communication cable 254. The CPU 245 is configured to perform various types of control required to discharge a sheet in accordance with a control program stored in the memory 246. The memory 246 is a storage device in which the control program is stored. The discharge controller 247 is configured to perform control for conveying a conveyed sheet to a sheet stacking tray 341 (FIG. 5), an escape tray (purge tray) 346 (FIG. 5), or the finisher 111, following an instruction from the CPU 245.

A configuration of the finisher 111 of the image forming apparatus 101 is described next. The finisher 111 includes a communication I/F 249, a CPU 250, a memory 251, a discharge controller 252, and a finishing process portion 253. The components are connected to one another via a system bus 255. The communication OF 249 is connected to the printer 107 via the communication cable 254. The finisher 111 holds communication required for control to and from the printer 107 via the communication cable 254. The CPU 250 is configured to perform various types of control required for finishing and discharge in accordance with a control program stored in the memory 251. The memory 251 is a storage device in which the control program is stored. The discharge controller 252 is configured to control the conveyance and discharge of a sheet following an instruction from the CPU 250. The finishing process portion 253 is configured to control finishing processing, which is stapling, punching, saddle stitch binding, or the like, following an instruction from the CPU 250.

A configuration of the external controller 102 is described next. The external controller 102 includes a CPU 208, a memory 209, an HDD 210, a keyboard 211, a display 212, a LAN I/F 213. a LAN I/F 214, and a video I/F 215. The components are connected to one another via a system bus 216. The CPU 208 is configured to execute, in a comprehensive manner, processing including reception of print data from the PC 103, RIP processing, and transmission of print data that is original data to the printer 107, based on programs and data stored in the HDD 210. The memory 209 stores programs and data required when the CPU 208 executes various types of processing, and operates as a work area. The HDD 210 stores programs and data required for operation of printing processing and the like.

The keyboard 211 is used by the user in order to input an operation instruction to the external controller 102. The display 212 is configured to display information of an application that is run in the external controller 102 and other information with a video signal of a still image or a moving image. The LAN I/F 213 is connected to the PC 103 via the external LAN 104. The external controller 102 communicates a print instruction and the like to and from the PC 103 via the external LAN 104. The LAN I/F 214 is connected to the printer 107 via the internal LAN 105. The external controller 102 communicates a print instruction and the like to and from the printer 107 via the internal LAN 105. The video I/F 215 is connected to the printer 107 via the video cable 106. The external controller 102 communicates print data that is original data and the like to and from the printer 107 via the video cable 106.

A configuration of the PC 103 is described next. The PC 103 includes a CPU 201, a memory 202, an HDD 203, a keyboard 204, a display 205, and a LAN OF 206. The components are connected to one another via a system bus 207. The CPU 201 is configured to generate print data and execute a print instruction based on a document processing program or the like stored in the HDD 203. The CPU 201 is also configured to control the devices connected to the system bus 207 in a comprehensive manner. The memory 202 stores programs and data required when the CPU 201 executes various types of processing, and operates as a work area. The HDD 203 stores programs and data required for operation of printing processing and the like. The keyboard 204 is used by the user in order to input an operation instruction to the PC 103. The display 205 is configured to display information of an application that is run on the PC 103 and other information with a video signal of a still image or a moving image. The LAN I/F 206 is connected to the external LAN 104. The PC 103 communicates a print instruction and the like to and from the external controller 102 via the external LAN 104.

The external controller 102 and the printer 107 are connected by the internal LAN 105 and the video cable 106. Connection between the external controller 102 and the printer 107, however, may be configured any way as long as data required for printing can be transmitted and received. For example, the external controller 102 and the printer 107 may be connected by the video cable 106 alone. Each of the memory 202, the memory 209, the memory 223, the memory 234, the memory 239, the memory 246, and the memory 251 can be any storage device for storing data and a program. Those memories may be, for example, volatile RAMs, non-volatile ROMs, built-in HDDs, external HDDs, or USB memories.

FIG. 5 is a cross-sectional view of the image forming apparatus 101. The printer 107 is configured to form an image on a sheet in accordance with image data that is original data. The printer 107 is provided with feed decks 301 and 302. The feed decks 301 and 302 each can accommodate various types of sheets. The feed decks 301 and 302 are each configured to separate the topmost sheet among accommodated sheets one by one, and conveys the separated sheet to a sheet conveying path 303. Developing stations 304, 305, 306, and 307 are configured to form toner images on surfaces of photosensitive drums with the use of a yellow (Y) toner, a magenta (M) toner, a cyan (C) toner, and a black (K) toner, respectively, in order to form a color image. The toner images formed on the surfaces of the photosensitive drums are transferred by primary transfer onto an intermediate transfer belt 308. The intermediate transfer belt 308 is configured to rotate clockwise in FIG. 5, and the toner images are transferred at a secondary transfer position 309 onto the sheet conveyed from the sheet conveying path 303. The display portion 225 is configured to display a printing status of the image forming apparatus 101 and information for setting the image forming apparatus 101.

The first fixing unit 311 is configured to fix the toner images to the sheet. The first fixing unit 311 includes a pressure roller and a heating roller. The toners are melted under pressure by the passing of the sheet through a nip between the pressure roller and the heating roller, and the toner images are thus fixed to the sheet. The sheet having passed through the first fixing unit 311 travels on a sheet conveying path 312 to be conveyed to a sheet conveying path 315. Some types of sheets require further heating and pressuring to fix the toner images to the sheet. In that case, the sheet having passed through the first fixing unit 311 is conveyed to a second fixing unit 313 through a sheet conveying path on an upper side. The second fixing unit 313 applies further heat and pressure to the sheet, to thereby fix the toner images to the sheet. The sheet having passed through the second fixing unit 313 travels on a sheet conveying path 314 to be conveyed to the sheet conveying path 315. When an image forming mode is double-sided printing, the sheet is conveyed to a sheet reversing path 316. The sheet is reversed in terms of front and back by the sheet reversing path 316, and is then conveyed to a double-sided printing conveying path 317. The sheet is conveyed from the double-sided printing conveying path 317 to the sheet conveying path 303, and toner images are transferred onto the back side (second side) of the sheet at the secondary transfer position 309.

The inserter 108 is configured to insert an insertion sheet. The inserter 108 includes an inserter tray 321 on which the insertion sheet is placed. The inserter 108 conveys the insertion sheet from the inserter tray 321 to a sheet conveying path 333 through a sheet conveying path 322. The insertion sheet can thus be inserted in a suitable place in relation to a series of sheets conveyed from the printer 107, for example, before, among, or after the series of sheets. The inserter 108 includes a conveyance roller provided with a side-shift roller and a skew roller. The inserter 108 has a shift mechanism, which, when a sheet deviates from a reference position in a direction (side direction) orthogonal to the sheet conveyance direction, uses the side-shift roller and the skew roller to correct the deviation of the sheet and bring the sheet back to the reference position.

The sheet having passed through the inserter 108 is conveyed to the inspection device 109. The image reading sensors 331 and 332 are arranged so as to face each other in the inspection device 109. The image reading sensor 331 is configured to read a top side (one side) of the sheet being conveyed on the sheet conveying path 333. The image reading sensor 332 is configured to read a bottom side (the other side) of the sheet being conveyed on the sheet conveying path 333. The inspection device 109 uses the image reading sensors 331 and 332 to read images of the sheet at the time when the sheet conveyed to the sheet conveying path 333 reaches a predetermined position. The inspection device 109 determines whether the images formed by the printer 107 are normal based on reading results (detection results) of the image reading sensors 331 and 332. An inspection result by the inspection device 109 is displayed on the display portion 241.

A large number of sheets can be placed in the high capacity stacker 110. The high capacity stacker 110 includes the sheet stacking tray 341 as a tray on which sheets are placed. The sheet having passed through the inspection device 109 travels on a sheet conveying path 344 to be placed in the high capacity stacker 110. The sheet is placed on the sheet stacking tray 341 from the sheet conveying path 344 via a sheet conveying path 345. The high capacity stacker 110 further includes the escape tray 346 as a discharge tray. A sheet determined by the inspection device 109 to be defective is discharged to the escape tray 346 from the sheet conveying path 344 via a sheet conveying path 347.

A sheet to be conveyed to the finisher 111 as a post-processing device connected downstream of the high capacity stacker 110 in the sheet conveyance direction is conveyed to the finisher 111 from the sheet conveying path 344 via a sheet conveying path 348. The high capacity stacker 110 is provided with a reverse portion 349 configured to reverse a sheet. The reverse portion 349 is used to place a sheet on the sheet stacking tray 341. When a sheet is to be placed on the sheet stacking tray 341 so that a direction in which the sheet is input and a direction in which the sheet is output are the same, the sheet is reversed once by the reverse portion 349. The operation of reversing a sheet by the reverse portion 349 is not executed for a sheet to be conveyed to the escape tray 346 or the finisher 111 because the sheet is discharged as it is without being reversed prior to being placed on the tray.

The finisher 111 is configured to perform, on a sheet conveyed thereto, post-processing (hereinafter referred to as "finishing processing") that corresponds to a function specified by the user. Specifically, the finisher 111 has a finishing function including stapling (one-place stapling, two-place stapling), punching (two holes, three holes), saddle stitch binding, and others. The finisher 111 has two discharge trays 351 and 352. The sheet is discharged to the discharge tray 351 via a sheet conveying path 353. However, stapling and other types of finishing processing cannot be performed on the sheet passing on the sheet conveying path 353. When stapling or another type of finishing processing is to be performed on a sheet, the sheet receives finishing processing specified by the user in a processing portion 355 via a sheet conveying path 354, and is discharged to the discharge tray 352.

The discharge trays 351 and 352 can each be lifted and dropped. The discharge tray 351 may be dropped down so that a sheet on which finishing processing has been performed in the processing portion 355 can be placed on the discharge tray 351. When saddle stitch binding is specified, a saddle stitch processing portion 356 performs stapling processing on a central portion of sheets, and then the sheets are folded in half to form a saddle stitch-bound bundle. The saddle stitch-bound bundle is discharged to a saddle stitch binding tray 358 via a sheet conveying path 357. The saddle stitch binding tray 358 includes a belt conveyor. The saddle stitch-bound bundle placed on the saddle stitch binding tray 358 is conveyed leftward by the belt conveyor.

The CPU 238 of the inspection device 109 inspects an image of a sheet conveyed thereto in accordance with an inspection item set in advance. The inspection of the image of the sheet is accomplished by a comparison between correct image data stored in the memory 239 in advance and read image data of the image of the conveyed sheet. Examples of the method of comparing the images include a method in which pixel values are compared at each position in the images, a method in which the position of an object is compared by edge detection, and a character data extraction method using optical character recognition (OCR). Examples of the inspection item include a shift in printing position, a hue of the image, a density of the image, streaks and faint printing, stains, and blank spots. Data of those is calculated from the image data read by the inspection device 109, to be used in determination of the image.

Inspection Process

In the first embodiment, when the same image defect is detected in succession in images on a plurality of sheets (a plurality of recording media) (hereinafter referred to as "continuous NG: No Good") by the inspection device 109, whether continuous NG has reached a predetermined number of times is determined. When image defects are detected in succession a predetermined number of times, image forming (output) by the printer 107 is stopped. "Continuous NG" refers to successive occurrences of the same type of streak, dot, blank spot, or stain in the same place in read images that are read by the image reading sensors 331 and 332. Here, continuous NG in a case in which the same image defect in the form of a vertical line is detected in succession is described as an example. When continuous NG reaches a predetermined number of times, whether a factor that is a cause of continuous NG is the printer 107 or the image reading sensors 331 and 332 of the inspection device 109 is determined.

Figure 6:
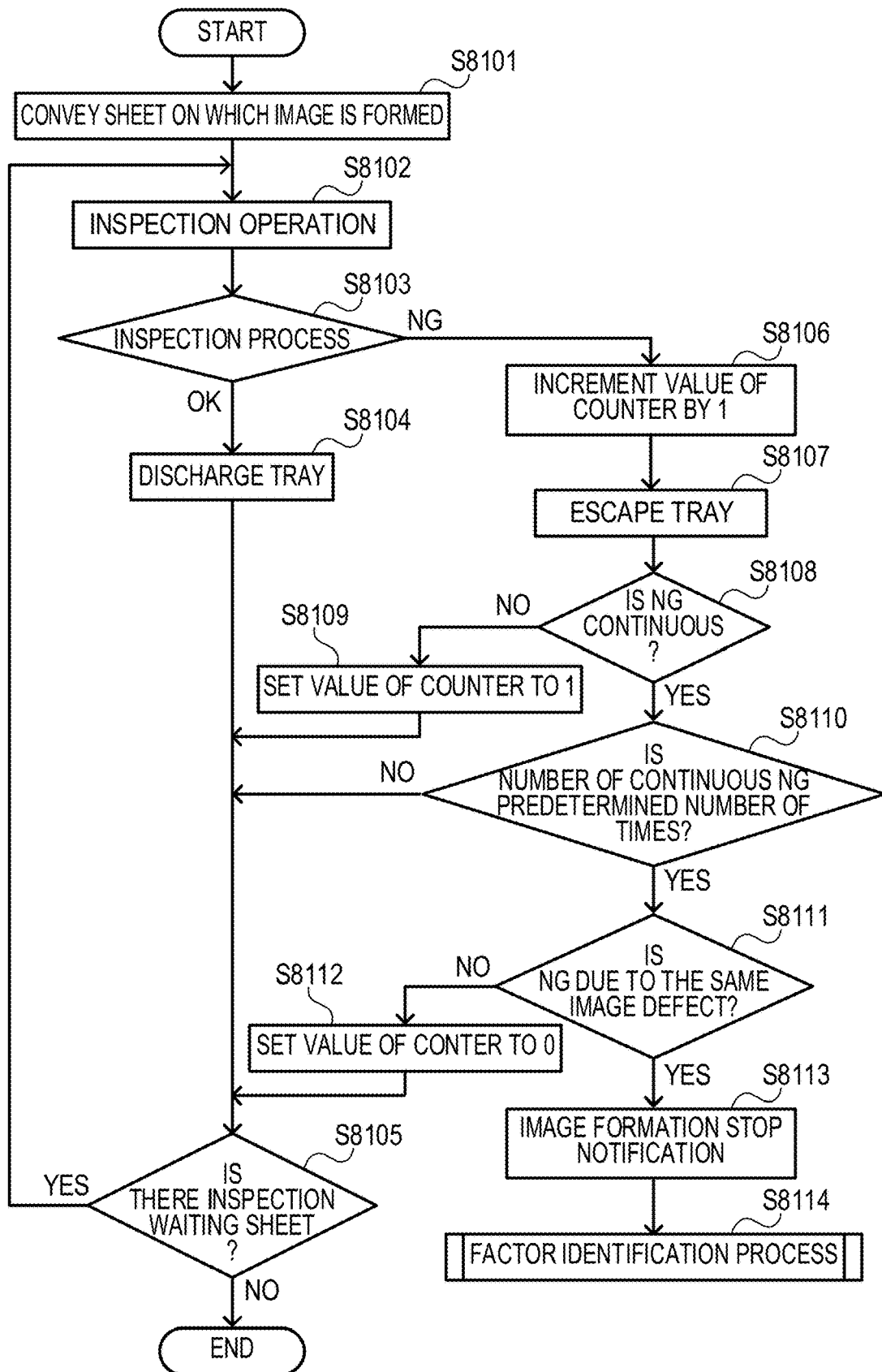
FIG. 6 is a flow chart of an inspection process.

FIG. 6 is a flow chart of an inspection process. The CPU 238 of the inspection device 109 determines whether the number of times that inspection results are determined to be NG in succession has reached a predetermined number of times in the inspection process. The predetermined number of times may be specified by the user. The CPU 238 functions as a determination unit configured to determine the predetermined number of times based on user's instruction information. When the number of times that inspection results are determined to be NG in succession reaches the predetermined number, the CPU 238 determines whether the successive inspection results determined to be NG are due to the same image defect. When the successive inspection results determined to be NG are due to the same image defect, the CPU 238 executes a factor identification process in which whether a cause of the image defect (a defect factor) is the printer 107 or the image reading sensor 331 is determined. The factor identification process is described later with reference to FIG. 7.

The inspection process executed by the CPU 238 as a controller is described below with reference to FIG. 6. The CPU 238 executes the inspection process in accordance with a program stored in the memory 239. A sheet on which an image has been formed by the printer 107 is conveyed from the printer 107 to the inspection device 109 via the inserter 108. The CPU 238 conveys the sheet on which the image is formed to the sheet conveying path 333 (Step S8101). The inspection device 109 is provided with the image reading sensor 331, which is configured to read the top side (first side) of a sheet and is located on an upper side (one side) of the sheet conveying path 333. The inspection device 109 is provided with the image reading sensor 332, which is configured to read the bottom side (second side) of a sheet and is located on a lower side (the other side opposite from the one side across the sheet conveying path 333) of the sheet conveying path 333. The CPU 238 executes inspection operation in which the top side (first side) of the sheet is inspected by the image reading sensor 331 in time with the conveyance of the sheet (Step S8102).

The CPU 238 executes the inspection process based on image data of the image read by the image reading sensor 331, and determines whether the inspection result of the inspection process is "OK" or "NG" (Step S8103). When the inspection result is OK ("OK" in Step S8103), the CPU 238 conveys the sheet to the high capacity stacker 110 so that the sheet is discharged to a discharge tray (the sheet stacking tray 341, the discharge tray 351, the discharge tray 352, or the saddle stitch binding tray 358) (Step S8104). The CPU 238 advances the processing to Step S8105.

When the inspection result is NG ("NG" in Step S8103), the CPU 238 increments a value of a counter built in the CPU 238 by 1 (Step S8106). The CPU 238 conveys the sheet to the high capacity stacker 110 so that the sheet is discharged to the escape tray 346 of the high capacity stacker 110 (Step S8107). The CPU 238 determines whether NG has occurred continuously (Step S8108). When determining that NG has not occurred continuously ("NO" in Step S8108), the CPU 238 sets the value of the counter to 1 (Step S8109), and advances the processing to Step S8105. When determining that NG has occurred continuously ("YES" in Step S8108), the CPU 238 determines whether the number of times that inspection results are determined to be NG in succession (hereinafter referred to as "the number of continuous NGs") has reached a predetermined number of times (Step S8110). When determining that the number of continuous NGs has not reached the predetermined number of times ("NO" in Step S8110), the CPU 238 advances the processing to Step S8105.

A setting screen 141 on which the number of continuous NGs is set is described. FIG. 12 is a schematic diagram of the setting screen 141 to be displayed on the display portion 241. When a command issued by the user to display the setting screen 141 is received from the operation portion 242, the CPU 238 displays the setting screen 141 illustrated in FIG. 12 on the display portion 241. The setting screen 141 displays radio buttons for setting whether printing and inspection are to be cancelled when the number of continuous NGs reaches the predetermined number of times. The setting screen 141 displays a field in which the predetermined number of times can be input. Selection of the radio button for cancellation enables the user to input to this field. When the user chooses to cancel printing and inspection, the CPU 238 receives a number input to the field. The CPU 238 receives user's instruction information about the predetermined number of times input to the field described above, and sets the numerical value input as the predetermined number of times as well. When the user chooses not to cancel printing and inspection on the setting screen 141, the CPU 238 do not cancel inspection and printing no matter how many times NG occurs in succession.

When determining that the number of continuous NGs has reached the predetermined number of times ("YES" in Step S8110), the CPU 238 determines whether the inspection results that are NG are due to the same image defect (the same defective phenomenon) (Step S8111). Specifically, whether inspection results that are NG are due to the same image defect is determined based on NG determination classification (image quality information) of inspection and position information of an NG occurrence point. When continuous NG varies in NG determination classification or in position information of an NG occurrence point, it is determined that the inspection results that are NG are not due to the same image defect ("NO" in Step S8111). The CPU 238 resets the value of the counter to 0 (Step S8112).

The CPU 238 advances the processing to Step S8105. The CPU 238 determines whether there is an inspection waiting sheet (Step S8105). When there is an inspection waiting sheet ("YES" in Step S8105), the CPU 238 returns the processing to Step S8102 to continue the inspection operation. When there is no inspection waiting sheet ("NO" in Step S8105), the CPU 238 ends the inspection process.

When continuous NG is the same in NG determination classification and in position information of an NG occurrence point, it is determined that the inspection results that are NG are due to the same image defect ("YES" in Step S8111). The CPU 238 transmits an image formation stop notification to the CPU 222 of the printer 107 (Step S8113). In Step S8113, the CPU 238 displays a cancellation screen 142 illustrated in FIG. 13 on the display portion 241. The cancellation screen 142 displays a message for notifying that inspection has been cancelled halfway. When the user presses an OK button on the cancellation screen 142, the CPU 238 shifts the screen displayed on the display portion 241 from the cancellation screen 142 to a screen for displaying an inspection result. The CPU 238 executes the factor identification process in which whether a cause of the image defect (defect factor) is the printer 107 or the image reading sensor 331 is determined (Step S8114).

Factor Identification Process

Figure 7:
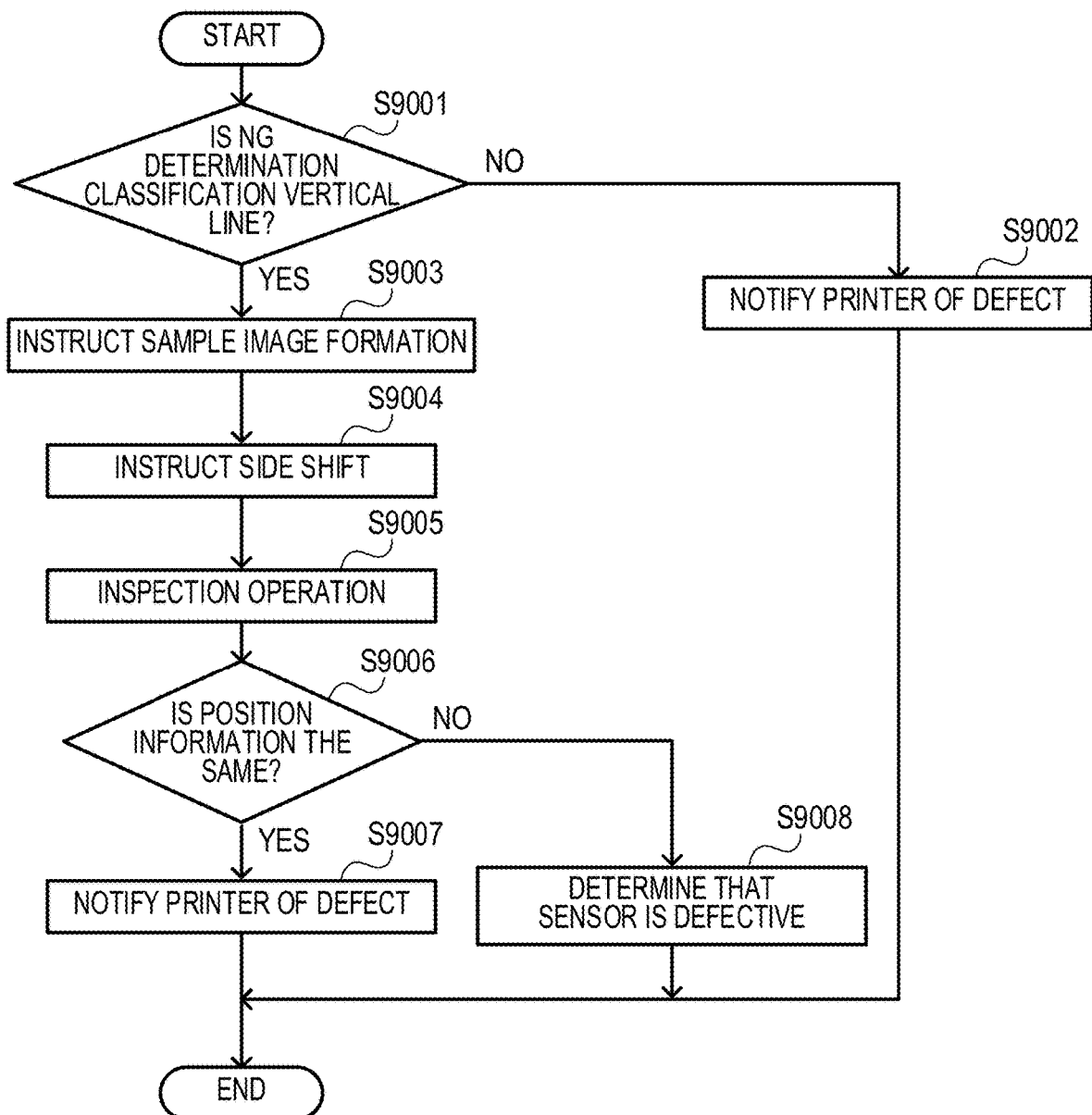
FIG. 7 is a flow chart of a factor identification process.

A sub-routine of the factor identification process executed in Step S8114 of FIG. 6 is described below with reference to FIG. 7. FIG. 7 is a flow chart of the factor identification process. In the factor identification process, the CPU 238 determines whether the cause of the image defect is the printer 107 or the image reading sensors 331 and 332. First, the CPU 238 determines whether the NG determination classification of continuous NG is a vertical line (Step S9001). When the NG determination classification of continuous NG is not the vertical line ("NO" in Step S9001), the CPU 238 determines that the cause of the image defect is the printer 107, and notifies the defect to the CPU 222 of the printer 107 (Step S9002). The CPU 238 ends the factor identification process.

When the NG determination classification of continuous NG is the vertical line ("YES" in Step S9001), the CPU 238 instructs the printer 107 to form a sample image (Step S9003). The CPU 238 instructs the inserter 108 to execute a side shift to shift sideways a sheet on which the sample image has been formed, with the use of the shift mechanism of the inserter 108 (Step S9004). The shift mechanism of the inserter 108 executes a side shift so that the sheet is shifted by 5 mm in a direction orthogonal to the sheet conveyance direction. In the first embodiment, the sheet is shifted rightward by 5 mm, but the shift mechanism is not limited thereto. The sheet may be shifted rightward by 6 mm or 4 mm, or may be shifted leftward by 5 mm. The CPU 238 executes inspection operation for the sheet with the sample image formed thereon (Step S9005).

The CPU 238 determines whether position information of the vertical line in the sample image is the same as the position information of the NG occurrence point of continuous NG, based on the result of the inspection process (Step S9006). When the position information of the vertical line in the sample image is the same as the position information of the NG occurrence point of continuous NG ("YES" in Step S9006), the CPU 238 determines that the cause of the vertical line is the printer 107, and notifies the defect to the CPU 222 of the printer 107 (Step S9007). The CPU 238 ends the factor identification process.

When the position information of the vertical line in the sample image differs from the position information of the NG occurrence point of continuous NG ("NO" in Step S9006), the CPU 238 determines that the cause of the vertical line is the image reading sensor 331 (Step S9008). The CPU 238 ends the factor identification process.

In the first embodiment, the factor identification process is executed when an image formed on one side of a sheet is inspected by the inspection device 109 and the number of times that inspection results are determined to be NG in succession reaches the predetermined number of times. When an image defect that is a vertical line is detected at the same position in succession the predetermined number of times, the inspection results of continuous NG and the inspection result of the sample image are compared. Whether the cause of NG is the printer 107 or the image reading sensor 331 is determined based on the result of the comparison. According to the first embodiment, when the same image defect is detected in succession in images on recording media, whether the cause of NG is the printer 107 or the image reading sensor 331 can be identified. According to the first embodiment, continuation of output of printed products that are determined to be errors as a result of inspection can be inhibited.

Second Embodiment

Description is made of a second embodiment. In the second embodiment, structure that is the same as the one in the first embodiment is denoted by the same reference symbols and numerals, and description thereof is omitted. The printing system 100 and an inspection process in the second embodiment are the same as those in the first embodiment, and description thereof is therefore omitted. A factor identification process in the second embodiment differs from the one in the first embodiment. The factor identification process in the second embodiment is described below.

Factor Identification Process

Figure 8:
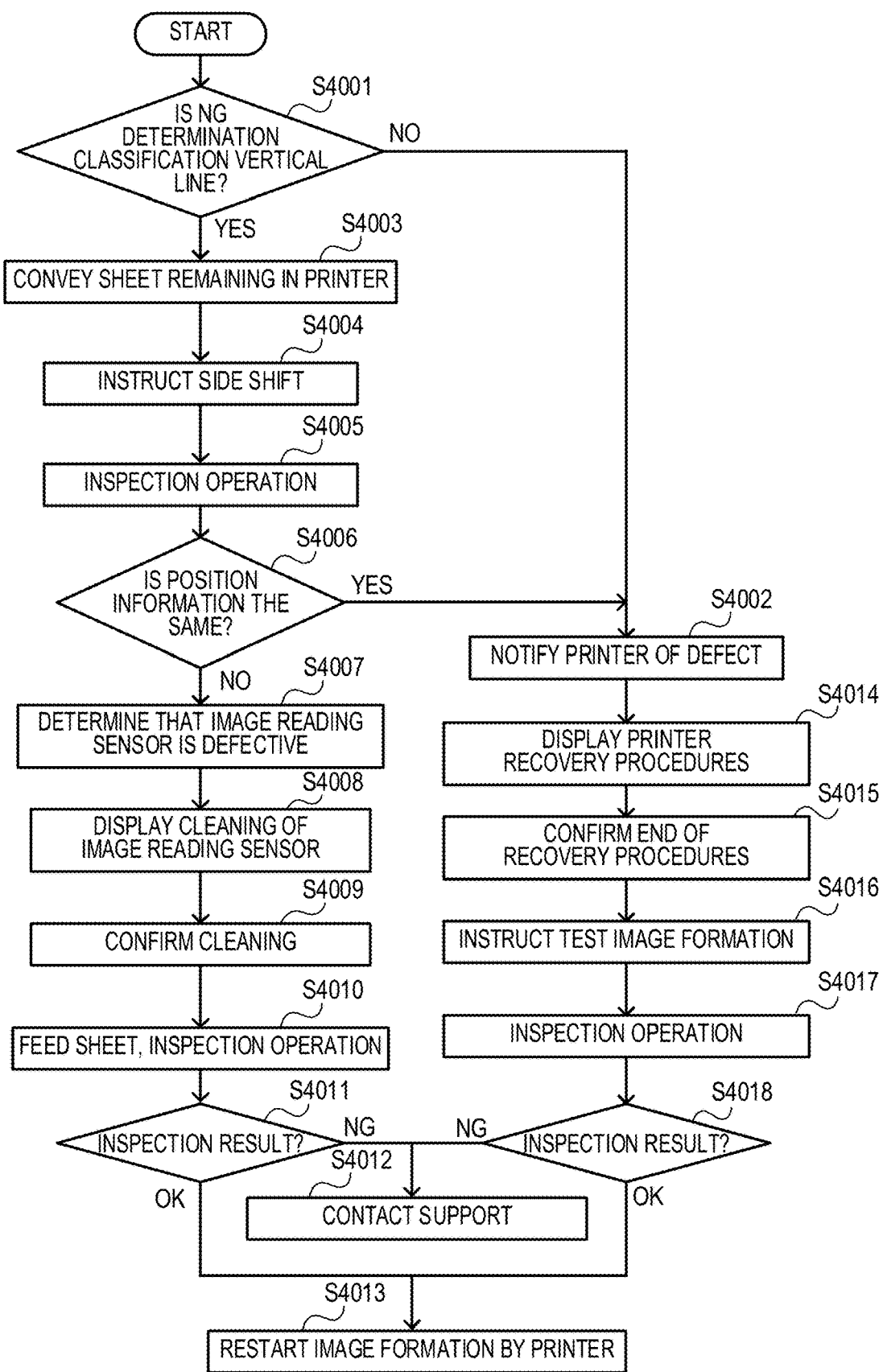
FIG. 8 is a flow chart of a factor identification process in a second embodiment.

A sub-routine of the factor identification process of the second embodiment executed in Step S8114 of FIG. 6 is described below with reference to FIG. 8. FIG. 8 is a flow chart of the factor identification process of the second embodiment. The CPU 238 determines whether the NG determination classification of continuous NG is the vertical line (Step S4001). When the NG determination classification of continuous NG is not the vertical line ("NO" in Step S4001), the CPU 238 determines that the cause of continuous NG is the printer 107, and notifies the defect to the CPU 222 of the printer 107 (Step S4002).

When the NG determination classification of continuous NG is the vertical line ("YES" in Step S4001), the CPU 238 conveys a sheet on which an image has been formed and which remains on the sheet conveying path 312, 314, or 315 of the printer 107 (Step S4003). The CPU 238 instructs the inserter 108 to execute a side shift to shift sideways the sheet with the image formed thereon by the shift mechanism of the inserter 108 (Step S4004). The side shift is not limited to the shift mechanism of the inserter 108. The side shift may be executed on a sheet conveying path by sliding the conveyance roller of the printer 107 in a side direction. The CPU 238 executes inspection operation for the sheet with the image formed thereon (Step S4005).

The CPU 238 determines whether position information of a vertical line in the image of the remaining sheet is the same as the position information of the NG occurrence point of continuous NG, based on the result of the inspection process (Step S4006). When the position information of the vertical line in the image of the remaining sheet differs from the position information of the NG occurrence point of continuous NG ("NO" in Step S4006), the CPU 238 determines that the cause of the vertical line is the image reading sensor 331 (Step S4007). The inspection device 109 displays alert to the user by displaying recovery (automatic restoration) procedures of the image reading sensor 331. For example, the inspection device 109 displays a prompt for the user to clean the image reading sensor 331 on the display portion 241 (Step S4008).

The CPU 238 checks whether the user has cleaned the image reading sensor 331 (Step S4009). When it is confirmed that the image reading sensor 331 has been cleaned, the CPU 238 feeds a sheet from the inserter 108 and executes inspection operation (Step S4010). The CPU 238 determines whether the inspection result is OK or NG (Step S4011). When the same vertical line occurs and the inspection result is NG ("NG" in Step S4011), it is highly probable that a failure has occurred in the image reading sensor 331, and the CPU 238 accordingly contacts a support desk (Step S4012). When the inspection result is OK ("OK" in Step S4011), on the other hand, the CPU 238 restarts image formation by the printer 107 (Step S4013).

When the position information of the vertical line in the image of the remaining sheet is the same as the position information of the NG occurrence point of continuous NG ("YES" in Step S4006), on the other hand, the CPU 238 determines that the cause of the vertical line is the printer 107 and notifies the printer 107 of the defect (Step S4002). The CPU 238 displays recovery procedures on the printer 107 (Step S4014). The CPU 238 checks whether the user has finished the recovery procedures of the printer 107 (Step S4015). When the end of the recovery procedures has been confirmed, the CPU 238 instructs the printer 107 to form a test image (Step S4016). The CPU 238 executes inspection operation for the test image (Step S4017).

The CPU 238 determines whether the inspection result is OK or NG (Step S4018). When the same vertical line occurs and the inspection result is NG ("NG" in Step S4018), the CPU 238 contacts the support desk (Step S4012). When the inspection result is OK ("OK" in Step S4018), on the other hand, the CPU 238 restarts image formation by the printer 107 (Step S4013).

According to the second embodiment, when the same image defect is detected in images on recording media in succession, whether the cause of NG is the printer 107 or the image reading sensor 331 can be identified. Diagnosis of recovery (automatic restoration) of the identified printer 107 or image reading sensor 331 is executed and, when the printer 107 or the image reading sensor 311 is restored, image formation by the printer 107 is restarted. When restoration fails, the support desk can be contacted. According to the second embodiment, continuation of output of printed products that are determined to be errors as a result of inspection can be inhibited.

Third Embodiment

Description is made of a third embodiment. In the third embodiment, structure that is the same as the one in the first embodiment is denoted by the same reference symbols and numerals, and description thereof is omitted. The printing system 100 and an inspection process in the third embodiment are the same as those in the first embodiment, and description thereof is therefore omitted. A factor identification process in the third embodiment differs from those in the first and second embodiments. The factor identification process in the third embodiment is described below. In the third embodiment, when the image reading sensor (first sensor) 331 detects an image defect that is a vertical line at the same position on the top side (first side) of a sheet in succession, the sheet is conveyed to the sheet reversing path 316 in the printer 107 to be switched back. The top side (first side) and bottom side (second side) of the sheet are reversed, and the image reading sensor (second sensor) 332 reads an image of the top side (first side) of the sheet. Inspection results of continuous NG and an inspection result of the image reading sensor 332 are compared. Whether the cause of NG is the printer 107 or the image reading sensor 331 is determined based on the result of the comparison.

Factor Identification Process

Figure 9:
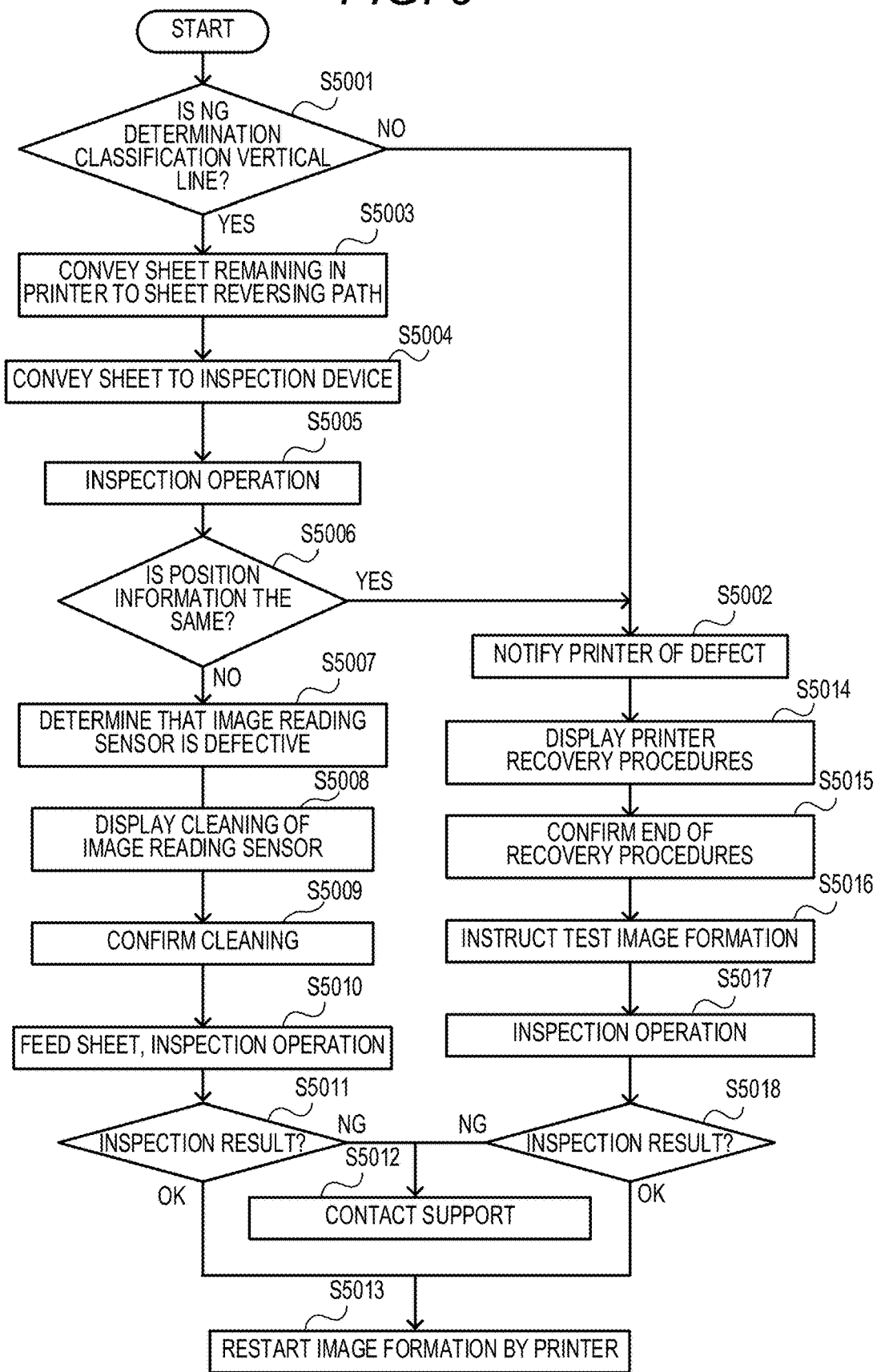
FIG. 9 is a flow chart of a factor identification process in a third embodiment.

A sub-routine of the factor identification process in the third embodiment to be executed in Step S8114 of FIG. 6 is described below with reference to FIG. 9. FIG. 9 is a flow chart of the factor identification process in the third embodiment. The CPU 238 determines whether the NG determination classification of continuous NG is the vertical line (Step S5001). When the NG determination classification of continuous NG is not the vertical line ("NO" in Step S5001), the CPU 238 determines that the cause of the image defect is the printer 107, and notifies the defect to the CPU 222 of the printer 107 (Step S5002).

When the NG determination classification of continuous NG is the vertical line ("YES" in Step S5001), the CPU 238 conveys a sheet on which an image has been formed and which remains on the sheet conveying path 312, 314, or 315 of the printer 107 to the sheet reversing path 316 (Step S5003). The sheet is switched back by the sheet reversing path 316 to reverse the front and back of the sheet. The CPU 238 conveys the sheet with the front and the back reversed to the inspection device 109 (Step S5004). The CPU 238 uses the image reading sensor (second sensor) 332 placed on the side below the sheet conveying path 333 to execute inspection operation for the sheet whose top side (first side) is facing downward (Step S5005).

The CPU 238 determines based on the result of the inspection process whether position information of a vertical line in the image of the switched back sheet is the same as the position information of the NG occurrence point of continuous NG (Step S5006). When the vertical line is detected at different positions in the inspection result of the image reading sensor (first sensor) 331 and the inspection result of the image reading sensor (second sensor) 332, it can be determined that the cause of continuous NG is the image reading sensor (first sensor) 331. When the vertical line is detected at the same position in the inspection result of the image reading sensor (first sensor) 331 and the inspection result of the image reading sensor (second sensor) 332, it can be determined that the cause of continuous NG is the printer 107. The CPU 238 accordingly executes processing as follows.

When position information of the vertical line in the image of the switched back sheet differs from the position information of the NG occurrence point of continuous NG ("NO" in Step S5006), the CPU 238 determines that the cause of the vertical line is the image reading sensor 331 (Step S5007). The inspection device 109 displays alert to the user by displaying recovery (automatic restoration) procedures of the image reading sensor 331. For example, the inspection device 109 displays a prompt for the user to clean the image reading sensor 331 on the display portion 241 (Step S5008).

The CPU 238 checks whether the user has cleaned the image reading sensor 331 (Step S5009). When it is confirmed that the image reading sensor 331 has been cleaned, the CPU 238 feeds a sheet from the inserter 108 and executes inspection operation (Step S5010). The CPU 238 determines whether the inspection result is OK or NG (Step S5011). When the same vertical line occurs and the inspection result is NG ("NG" in Step S5011), it is highly probable that a failure has occurred in the image reading sensor 331, and the CPU 238 accordingly contacts the support desk (Step S5012). When the inspection result is OK ("OK" in Step S5011), on the other hand, the CPU 238 restarts image formation by the printer 107 (Step S5013).

When the position information of the vertical line in the image of the switched back sheet is the same as the position information of the NG occurrence point of continuous NG ("YES" in Step S5006), on the other hand, the CPU 238 determines that the cause of the vertical line is the printer 107 and notifies the printer 107 of the defect (Step S5002). The CPU 238 displays recovery procedures on the printer 107 (Step S5014). The CPU 238 checks whether the user has finished the recovery procedures of the printer 107 (Step S5015). When it is confirmed that the end of the recovery procedures has been confirmed, the CPU 238 instructs the printer 107 to form a test image (Step S5016). The CPU 238 executes inspection operation for the test image (Step S5017).

The CPU 238 determines whether the inspection result is OK or NG (Step S5018). When the same vertical line occurs and the inspection result is NG ("NG" in Step S5018), the CPU 238 contacts the support desk (Step S5012). When the inspection result is OK ("OK" in Step S5018), on the other hand, the CPU 238 restarts image formation by the printer 107 (Step S5013).

According to the third embodiment, when the same image defect is detected in images on recording media in succession, whether the cause of NG is the printer 107 or the image reading sensor 331 can be identified. Diagnosis of recovery (automatic restoration) of the identified printer 107 or image reading sensor 331 is executed and, when the printer 107 or the image reading sensor 311 is restored, image formation by the printer 107 is restarted. When restoration fails, the support desk can be contacted. According to the third embodiment, continuation of output of printed products that are determined to be errors as a result of inspection can be inhibited.

Fourth Embodiment

Description is made of a fourth embodiment. In the fourth embodiment, structure that is the same as the one in the first embodiment is denoted by the same reference symbols and numerals, and description thereof is omitted. The printing system 100 and an inspection process in the fourth embodiment are the same as those in the first embodiment, and description thereof is therefore omitted. In the fourth embodiment, the printer 107 forms an image on each side of a sheet in a double-sided printing mode. A factor identification process in the fourth embodiment is executed when images formed on both sides of a sheet are to be inspected. The factor identification process in the fourth embodiment differs from those in the first to third embodiments. The factor identification process in the fourth embodiment is described below.

Factor Identification Process

Figure 10:
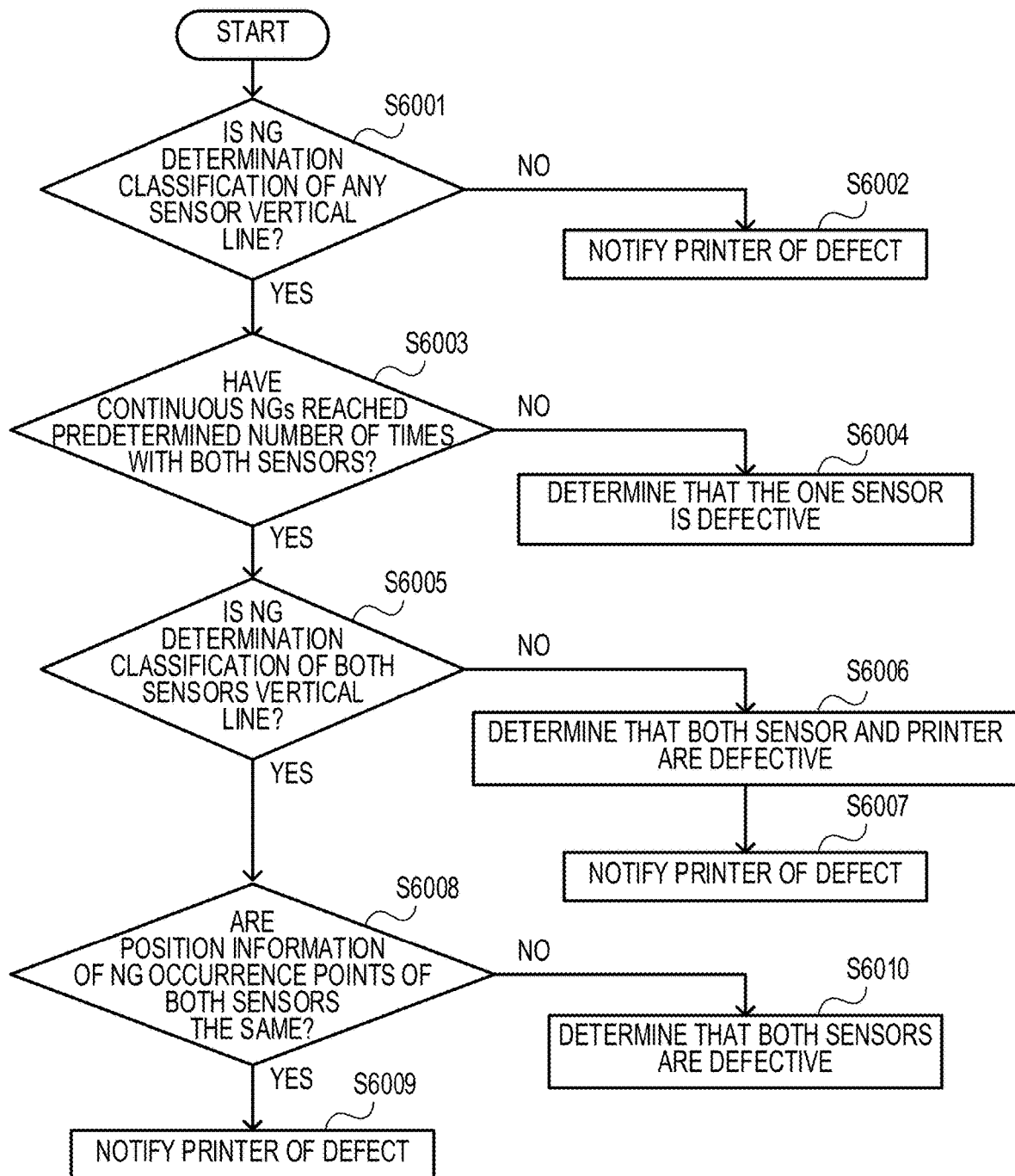
FIG. 10 is a flow chart of a factor identification process in a fourth embodiment.

A sub-routine of the factor identification process in the fourth embodiment to be executed in Step S8114 of FIG. 6 is described below with reference to FIG. 10. FIG. 10 is a flow chart of the factor identification process in the fourth embodiment. The CPU 238 determines whether the NG determination classification of continuous NG is the vertical line in any one of the NG determination classification of the image reading sensor (first sensor) 331 and the NG determination classification of the image reading sensor (second sensor) 332 (Step S6001). When none of the NG determination classification of the image reading sensor (first sensor) 331 and the NG determination classification of the image reading sensor (second sensor) 332 is the vertical line ("NO" in Step S6001), the CPU 238 determines that the cause of continuous NG is the printer 107, and notifies the defect to the CPU 222 of the printer 107 (Step S6002).

When at least one of the NG determination classification of the image reading sensor 331 or the NG determination classification of the image reading sensor 332 is the vertical line ("YES" in Step S6001), the CPU 238 determines whether the number of continuous NGs has reached the predetermined number of times with both of the image reading sensors 331 and 332 (Step S6003). When determining that the number of continuous NGs has reached the predetermined number of times with only one of the image reading sensors 331 and 332 ("NO" in Step S6003), the CPU 238 determines that the one of the image reading sensors 331 and 332 is defective (Step S6004). When determining that the number of continuous NGs has reached the predetermined number of times with both of the image reading sensors 331 and 332 ("YES" in Step S6003), the CPU 238 determines whether the NG determination classification of the image reading sensor 331 and the NG determination classification of the image reading sensor 332 are both vertical line (Step S6005).

When the NG determination classification of continuous NG differs between the image reading sensors 331 and 332 ("NO" in Step S6005), the CPU 238 determines that one image reading sensor and the printer 107 are both defective (Step S6006). The image reading sensor determined to be defective is the one for which it is determined that the NG determination classification of continuous NG is the vertical line. A defect in the image read by the image reading sensor for which it is determined that the NG determination classification is not the vertical line is determined to be caused by the printer 107. The CPU 238 notifies the printer 107 of the defect (Step S6007).

When the NG determination classification is the vertical line for both of the image reading sensors 331 and 332 ("YES" in Step S6005), the CPU 238 determines whether the image reading sensors 331 and 332 have the same position information of the NG occurrence point (Step S6008). When the image reading sensors 331 and 332 have the same position information of the NG occurrence point ("YES" in Step S6008), the CPU 238 determines that the printer 107 is defective, and notifies the printer 107 of the defect (Step S6009). When the image reading sensors 331 and 332 differ from each other in position information of the NG occurrence point ("NO" in Step S6008), the CPU 238 determines that the image reading sensors 331 and 332 are both defective (Step S6010).

The factor identification process in the fourth embodiment is executed when images formed on both sides of a sheet by the printer 107 with the image forming mode set to the double-sided printing mode are to be inspected. According to the fourth embodiment, when the same image defect is detected in succession in images on recording media, whether the cause of NG is the printer 107, the image reading sensors 331 and 332, or both of the printer 107 and the image reading sensors 331 and 332 can be identified. According to the fourth embodiment, continuation of output of printed products that are determined to be errors as a result of inspection can be inhibited.

Fifth Embodiment

Description is made of a fifth embodiment. In the fifth embodiment, structure that is the same as the one in the first embodiment is denoted by the same reference symbols and numerals, and description thereof is omitted. The printing system 100 and an inspection process in the fifth embodiment are the same as those in the first embodiment, and description thereof is therefore omitted. In the fifth embodiment, improvement operation is executed when the cause of NG is identified as the printer 107, the image reading sensor 331, or both of the printer 107 and the image reading sensor 331 in the factor identification processes of the first to fourth embodiments. The improvement operation in the fifth embodiment is described below.

Improvement Operation

Figure 11:
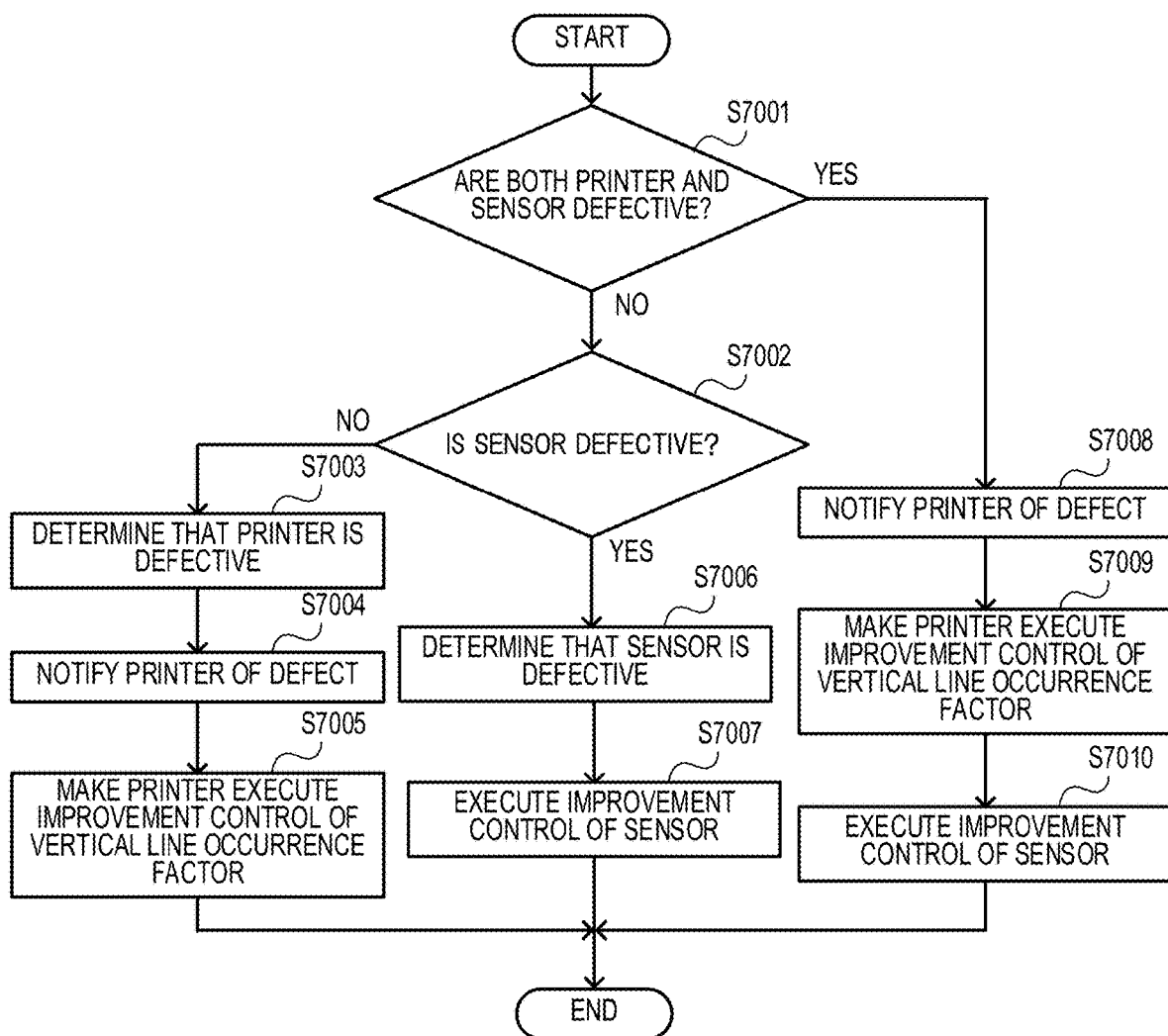
FIG. 11 is a flow chart of improvement operation in a fifth embodiment.

FIG. 11 is a flow chart of the improvement operation in the fifth embodiment. The CPU 238 determines whether defects occur in both of the printer 107 and the image reading sensor 331 or 332 (Step S7001). When a defect occurs in one of the printer 107 and the image reading sensor 331 or 332 ("NO" in Step S7001), the CPU 238 determines whether the defect occurs in the image reading sensor 331 or 332 (Step S7002). When the defect does not occur in the image reading sensor 331 or 332 ("NO" in Step S7002), the CPU 238 determines that the printer 107 is defective (Step S7003). The CPU 238 notifies the printer 107 of the defect (Step S7004). The CPU 238 makes the printer 107 execute improvement control for improving a vertical line occurrence factor (Step S7005). Specifically, the printer 107 executes cleaning of a wire of a charger and belt-pattern application control in which a toner image is formed in a belt-like shape in order to prevent a toner from slipping along a cleaning member. The CPU 238 ends the improvement operation.

When a defect occurs in the image reading sensor 331 or 332 ("YES" in Step S7002), the CPU 238 determines that the image reading sensor 331 or 332 is defective (Step S7006). The CPU 238 executes improvement control for improving the image reading sensor 331 or 332 (Step S7007). Specifically, an output trouble of the image reading sensor 331 or 332 is improved through a removal of a foreign object adhering to the image reading sensor 331 or 332 by putting a cleaning member of the image reading sensor 331 or 332 into operation. The CPU 238 ends the improvement operation.

When defects occur in both of the printer 107 and the image reading sensor 331 or 332 ("YES" in Step S7001), the CPU 238 notifies the printer 107 of the defect (Step S7008). The CPU 238 makes the printer 107 execute improvement control for improving a vertical line occurrence factor (Step S7009). At the same time, the CPU 238 executes improvement control of the image reading sensor 331 or 332 (Step S7010). The CPU 238 ends the improvement operation.

In the fifth embodiment, the cleaning of the wire of the charger and belt-pattern application control in which a toner image is formed in a belt-like shape in order to prevent a toner from slipping along the cleaning member are given as examples of the improvement control executed by the printer 107 to improve a vertical line occurrence factor. However, the improvement control executed by the printer 107 to improve a vertical line occurrence factor is not limited to those, and may be another form of control for preventing occurrence of a vertical line. In the fifth embodiment, control for putting the cleaning member of the image reading sensor 331 or 332 into operation is described as an example of the improvement control of the image reading sensor 331 or 332. However, the improvement control of the image reading sensor 331 or 332 is not limited thereto, and may be another form of control for improving an output trouble of the image reading sensor 331 or 332.

As described above, the image forming apparatus 101 can be brought back from an image formation ceasing state to a normal state by executing the improvement control after identifying which of the printer 107 and the image reading sensor 331 or 332 is the cause of NG. In the fifth embodiment, after the improvement control is executed, a print job may be resumed from an image determined to be NG in the inspection process, and the inspection process may then be performed. When a defect (streak or dot) of the same type as the one in an inspection result prior to the execution of the improvement control appears at the same position in an inspection result of the image immediately after the resumption, alert may be displayed on the display portion 225 of the printer 107 at the same time as the image forming operation of the printer 107 is stopped. The inspection device 109 may be controlled so as to hold off the execution of the inspection process by the inspection device 109 until a service person performs a checkup.

According to the fifth embodiment, when inspection results indicate NG in succession, a factor of NG is identified and diagnosis on whether automatic restoration is possible can be performed. According to the fifth embodiment, when images formed in succession have the same image defect, whether the cause of the image defect is the printer 107 or one of the image reading sensors 331 and 332 can be identified. According to the fifth embodiment, continuation of output of printed products determined to be errors as a result of inspection can be inhibited.

The inspection device 109 in the fifth embodiment includes the CPU 238 and the display portion 241, which function as an information processing apparatus. However, the inspection device 109 may be connected, via a network, to an information processing apparatus that is a device separate from the inspection device 109. For example, a configuration may be employed in which the CPU 208 and display 212 of the external controller 102 function as an information processing apparatus. An alternative configuration may be employed in which the CPU 201 and display 205 of the PC 103 function as an information processing apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-028538, filed Feb. 21, 2020, which is hereby incorporated by reference herein in its entirety.

What is claimed is:

1. An information processing apparatus configured to communicate with an image forming apparatus that forms an image on a sheet, and communicate with a reader that reads the image on the sheet conveyed from the image forming apparatus, the reader being connected to the image forming apparatus, the information processing apparatus comprising:
a controller configured to:
obtain read image data related to the image on the sheet output from the reader;
perform inspection operation based on the read image data and reference data registered in advance;
output an inspection result of the inspection operation to a display;
determine a defective sheet having image defect for each sheet based on the inspection result of the inspection operation;
interrupt image forming operation by the image forming apparatus in a case where a number of defective sheets are continuous for a predetermined number of sheets;
identify a cause of defects occurred in the defective sheets;
display recovery procedures on the display;
form a test image after a recovery;
inspect the test image based on image data obtained by the reader reading the test image; and
resume the image forming operation by the image forming apparatus in a case where the inspection result of the test image is OK.

2. The information processing apparatus according to claim 1, wherein the controller detects a type of an image defect occurred in the read image data, and
wherein the controller interrupts the image forming operation in a case where the number of defective sheets, having the image defect of a predetermined type in succession becomes the predetermined number.

3. The information processing apparatus according to claim 1, wherein the controller is further configured to control whether to form the test image based on a type of an image defect occurred in the read image data.

4. The information processing apparatus according to claim 1, wherein the controller is further configured to determine, based on a type of the image defect occurred in the read image data, which one of the image forming apparatus and the reader is a cause of the image defect occurred in the read image data.

5. The information processing apparatus according to claim 1, wherein the controller is further configured to notify an interruption of the image forming operation in a case where the number of the defective sheets in succession becomes the predetermined number.

6. The information processing apparatus according to claim 1, wherein the controller is further configured to stop a conveyance of the sheet from the image forming apparatus in a case where a number of the defective sheets in succession becomes the predetermined number.

7. The information processing apparatus according to claim 1, wherein the controller does not resume the image forming operation by the image forming apparatus in a case where the inspection result of the test image is NG.

8. A reader configured to read an image formed on a sheet conveyed from an image forming apparatus, the reader comprising:
a controller configured to:
obtain read image data related to the image on the sheet output from the reader;
perform an inspection operation in which the image read by the reader is inspected based on the read image data and reference data; and
output an inspection result of the inspection operation to a display,
output a signal for interrupting image forming operation by the image forming apparatus in a case where a number of defective sheets are continuous for a predetermined number of sheets;
identify a cause of defects occurred in the defective sheets;
display recovery procedures on the display;
output a signal for forming a test image by the image forming apparatus after a recovery;
inspect the test image based on image data obtained by the reader reading the test image; and
resume the image forming operation by the image forming apparatus in a case where the inspection result of the test image is OK.

9. The reader according to claim 8, wherein the controller detects a type of an image defect occurred in the read image data, and
wherein the controller outputs a signal used to stop the image forming operation in a case where sheets that are indicated by the inspection result as the defective sheets having the image defect of a predetermined type continue beyond the predetermined number.

10. The reader according to claim 8, wherein the controller is further configured to control whether to form the test image based on a type of an image defect occurred in the read image data.

11. The reader according to claim 8, wherein the controller is further configured to determine whether a cause of the image defect occurring in the read image data is the reader based on a type of the image defect occurred in the read image data.

12. The reader according to claim 8, wherein the controller is further configured to notify an interruption of the image forming operation in a case where the number of the defective sheets reaches the predetermined number.

13. The reader according to claim 8, wherein the controller is further configured to notify an interruption of the image forming operation in a case where the sheets that are indicated by the inspection result as the defective sheets continue beyond the predetermined number.

14. The reader according to claim 8, wherein the controller is further configured to output a signal used to stop a conveyance of the sheet in a case where the sheets that are indicated by the inspection result as the defective sheets continue beyond the predetermined number.

15. The reader according to claim 8, wherein the controller does not output a signal for resuming the image forming operation by the image forming apparatus in a case where the inspection result of the test image is NG.

16. An image forming apparatus comprising:
an image forming unit configured to form an image on a sheet;
a reader configured to read the image formed on the sheet by the image forming unit; and at least one processor configured to:
- determine whether the image formed on the sheet has an image defect based on an image read by the reader and a reference data;
- interrupt image forming operation in a case where a number of defective sheets are continuous for a predetermined number of sheets;
- identify a cause of defects occurred in the defective sheets;
- display recovery procedures on a display;
- form a test image after a recovery;
- inspect the test image based on image data obtained by the reader reading the test image; and
- resume the image forming operation in a case where an inspection result of the test image is OK.

17. The image forming apparatus according to claim 16, wherein the at least one processor stops the image forming operation by the image forming unit in a case where sheets that are determined as the formed images having image defect of a same type continue for the predetermined number.

18. The image forming apparatus according to claim 16, wherein the at least one processor does not stop the image forming operation by the image forming unit in a case where images formed on the predetermined number of sheets, respectively, do not have image defect of the same type even if sheets that are determined as the formed images having image defect continue for the predetermined number.

19. The image forming apparatus according to claim 16, wherein the at least one processor does not resume the image forming operation in a case where the inspection result of the test image is NG.

* * * * *